US012027802B2

(12) United States Patent
Someya et al.

(10) Patent No.: US 12,027,802 B2
(45) Date of Patent: Jul. 2, 2024

(54) CONNECTOR

(71) Applicant: Molex, LLC, Lisle, IL (US)

(72) Inventors: Toshiyuki Someya, Yamato (JP); Naoto Sasayama, Yamato (JP); Ryunosuke Miyamoto, Yamato (JP); Kenta Arichika, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 17/969,726

(22) Filed: Oct. 20, 2022

(65) Prior Publication Data

US 2023/0042553 A1 Feb. 9, 2023

Related U.S. Application Data

(63) Continuation of application No. 17/114,500, filed on Dec. 8, 2020, now Pat. No. 11,515,670.

(30) Foreign Application Priority Data

Dec. 10, 2019 (JP) ................................ 2019-222578

(51) Int. Cl.
*H01R 13/6471* (2011.01)
*H01R 13/405* (2006.01)
(Continued)

(52) U.S. Cl.
CPC ....... *H01R 13/6471* (2013.01); *H01R 13/405* (2013.01); *H01R 13/629* (2013.01); *H01R 13/6585* (2013.01); *H01R 13/6597* (2013.01)

(58) Field of Classification Search
CPC ....... H01R 12/716; H01R 12/73; H01R 12/57
See application file for complete search history.

(56) References Cited

U.S. PATENT DOCUMENTS 9,397,423 B2 * 7/2016 Suzuki ................ H01R 12/716
10,784,616 B2 * 9/2020 Gondo .................. H01R 13/41
(Continued)

FOREIGN PATENT DOCUMENTS

CN 103098307 A 5/2013
CN 108879145 A 11/2018
(Continued)

OTHER PUBLICATIONS

Notice of Allowance received for U.S. Appl. No. 17/114,500, mailed on Jun. 29, 2022, 08 Pages.
(Continued)

*Primary Examiner* — Truc T Nguyen

(57) ABSTRACT

A connector includes a connector body and a terminal attached to the connector body, the connector being fitted with a counterpart connector, the connector body includes a recess being fitted with a counterpart connector body of the counterpart connector and side walls extending in a longitudinal direction of the connector body, the side walls defining both sides of the recess. The terminal includes a plurality of terminals disposed along each of the side walls, and the plurality of terminals disposed along each of the side walls include one high frequency terminal and ground terminals disposed on both sides of the high frequency terminal. In plan view, a straight line connecting high frequency terminals disposed along both the side walls is inclined with respect to a center line of the connector body in a width direction, and a shield plate of the counterpart connector extends along the center line.

7 Claims, 10 Drawing Sheets

(51) Int. Cl.

| | |
|---|---|
| ***H01R 13/629*** | (2006.01) |
| ***H01R 13/6585*** | (2011.01) |
| ***H01R 13/6597*** | (2011.01) |

(56) References Cited

U.S. PATENT DOCUMENTS

| | | | | |
|---|---|---|---|---|
| 10,811,824 | B2 | 10/2020 | Teruki et al. | |
| 10,985,499 | B2 | 4/2021 | Miyamoto et al. | |
| 11,005,200 | B2 | 5/2021 | Ashibu | |
| 2009/0176386 | A1 | 7/2009 | Wu | |
| 2015/0079853 | A1 | 3/2015 | Tsai | |
| 2016/0036145 | A1* | 2/2016 | Hasegawa | H01R 12/73 439/78 |
| 2016/0064843 | A1* | 3/2016 | Hasegawa | H01R 12/716 439/65 |
| 2016/0294082 | A1* | 10/2016 | Matsuno | H01R 13/6275 |
| 2017/0005423 | A1* | 1/2017 | Takenaga | H01R 13/635 |
| 2018/0198241 | A1* | 7/2018 | Ooi | H01R 13/6597 |
| 2020/0212634 | A1 | 7/2020 | Teruki et al. | |
| 2021/0119386 | A1* | 4/2021 | Lee | H01R 12/716 |
| 2023/0107849 | A1* | 4/2023 | Han | H01R 13/04 439/78 |

FOREIGN PATENT DOCUMENTS

| | | | | |
|---|---|---|---|---|
| CN | 209516069 | U | 10/2019 | |
| CN | 209516221 | U | 10/2019 | |
| CN | 209544752 | U | 10/2019 | |
| CN | 110504565 | A | 11/2019 | |
| CN | 209571614 | U | 11/2019 | |
| CN | 209709216 | U | 11/2019 | |
| CN | 109038013 | B | 1/2020 | |
| JP | H08321358 | A | 12/1996 | |
| JP | H10106684 | A | 4/1998 | |
| JP | 2015106529 | * | 6/2015 | H01R 13/02 |
| JP | 2016146292 | A | 8/2016 | |
| JP | 2016207420 | A | 12/2016 | |
| JP | 2018022631 | A | 2/2018 | |
| JP | 6319210 | B2 | 5/2018 | |
| JP | 2018110087 | A | 7/2018 | |
| JP | 2018116925 | A | 7/2018 | |
| JP | 6493611 | B1 | 4/2019 | |
| JP | 2021068608 | A | 4/2021 | |
| KR | 20180060651 | A | 6/2018 | |
| KR | 20200110170 | A | 9/2020 | |
| TW | I558019 | B | 11/2016 | |
| TW | M581777 | U | 8/2019 | |

OTHER PUBLICATIONS

Notice of Allowance received for KR Application No. 10-2020-0168044, mailed on Sep. 22, 2022, 08 Pages (03 Pages of English translation and 05 Pages of Official notification).

Office Action received for CN Application No. 202011447698.3, mailed on Aug. 1, 2022, 13 Pages (07 Pages of English translation and 06 Pages of Official notification).

Office action received for KR application No. 10-2020-0168044, mailed on Apr. 7, 2022, 9 pages (5 pages of English translation and 4 pages of Official copy).

* cited by examiner

Prior art

CONNECTOR

RELATED APPLICATION

This application is a continuation of U.S. patent application Ser. No. 17/114,500, filed on Dec. 8, 2020, which in turn claims the benefit of Japanese Application No. 2019-222578, filed on Dec. 10, 2019, each of which is incorporated herein by reference in their entireties.

TECHNICAL FIELD

The present disclosure relates to a connector.

BACKGROUND ART

Connectors such as substrate-to-substrate connectors have been used to electrically connect pairs of parallel circuit boards to each other. Such connectors are attached to each of opposing surfaces of the pair of circuit boards, and fitted together to secure electric conduction. Furthermore, in order to prevent crosstalk between signal terminals, technology has been proposed in which a shield member is provided between the signal terminals (for example, see Patent Document 1).

FIG. 10 is a perspective view illustrating known terminals and shield members.

In the drawings, 851 is a reinforcing fitting attached to each longitudinal end of a housing of a connector mounted to a circuit board (not illustrated), and is connected to a side wall covering unit 852 attached to a side wall of the housing, and the side wall covering unit 852 is connected to a connection pad coupled to a ground trace of the circuit board by soldering or the like. Further, a plurality of signal terminals 861 are mounted side by side to each of the side walls on both left and right sides of the housing, and each of the signal terminals 861 is connected to the connection pad coupled to the signal trace of the circuit board by soldering or the like.

Shield plates 856 extending in the longitudinal direction of the housing are disposed between rows of the signal terminals 861 arranged on both left and right sides. Each of the shield plates 856 is connected to a side wall covering unit 857 attached to a side wall of the housing at a position facing the side wall covering unit 852 of the reinforcing fitting 851, and the side wall covering unit 857 is connected to a connection pad coupled to a ground trace of the circuit board by soldering, or the like. As a result, since the opposed signal terminals 861 on both sides are shielded from each other by the shield plates 856, even when a high frequency signal is transmitted, crosstalk between the signal terminals 861 can be prevented.

Prior Art Documents: Patent Documents: Patent Document 1 Japanese Unexamined Patent Application Publication No. 2018-110087

SUMMARY

However, in the known connector, since only one longitudinal end of each of the shield plates 856 extending in the longitudinal direction of the housing is connected to the ground trace of the circuit board via the side wall covering unit 857, the length of the electrically-conductive path to the ground trace increases in the vicinity of the other longitudinal end of each of the shield plates 856, and the shielding effect of the shield plates 856 decreases. In addition, since the interval between the signal terminals 861 is small, it is difficult to reliably prevent crosstalk.

Here, an object of the present disclosure is to solve the problems of the known connector, and to provide a highly reliable connector that has a high shielding effect and reliably reduces crosstalk.

Thus, a connector includes a connector body and a terminal attached to the connector body, the connector being fitted with a counterpart connector, the connector body includes a recessed groove and side walls extending in a longitudinal direction of the connector body, the side walls defining both sides of the recessed groove, the terminal includes a plurality of terminals disposed along each of the side walls, and the plurality of terminals disposed along each of the side walls include one high frequency terminal and ground terminals disposed on both sides of the high frequency terminal, and in plan view, a straight line connecting high frequency terminals disposed along both the side walls is inclined with respect to a center line of the connector body in a width direction, and when the connector is fitted with the counterpart connector, a shield plate of the counterpart connector is at least partially accommodated in the recessed groove and extends along the center line.

In another connector, the at least three terminals are disposed along each side wall.

In yet another connector, the connector body includes fitting guides formed at both ends in the longitudinal direction, the fitting guides being inserted into respective fitting recesses formed on counterpart fitting guides of a counterpart connector body, reinforcing fittings divided into two in the width direction of the connector body are attached to each of the fitting guides, and one of the two divided reinforcing fittings includes one of ground terminals disposed on both sides of the high frequency terminal.

In yet another connector, one of the two divided reinforcing fittings including one of the ground terminals disposed on both sides of the high frequency terminal is attached to the fitting guide such that the divided connector fittings face each other on a diagonal of the substantially rectangular connector body in a plan view.

In yet another connector, when the connector is fitted with the counterpart connector, the shield plate comes into contact with one of the two divided reinforcing fittings at both ends in the longitudinal direction.

In yet another connector, one of the two divided reinforcing fittings is larger than the other in a width direction dimension of the connector body.

In yet another connector, among the terminals, terminals other than the high frequency terminal and the ground terminals are power supply terminals.

The connector according to the present disclosure has a high shielding effect and reliably reduces crosstalk to improve reliability.

BRIEF DESCRIPTION OF THE DRAWINGS

FIGS. 3A and 3B are perspective views illustrating the first connector according to the present embodiment, wherein FIG. 3A is a perspective view when viewed from a fitting surface, and FIG. 3B is a perspective view when viewed from a mounting surface.

FIGS. 4A and 4B are two views illustrating the first connector according to the present embodiment, wherein FIG. 4A is a plan view, and FIG. 4B is a side view.

FIGS. 6A and 6B are perspective views illustrating the second connector according to the present embodiment, wherein FIG. 6A is a perspective view when viewed from a fitting surface, and FIG. 6B is a perspective view when viewed from a mounting surface.

FIGS. 7A and 7B are two views illustrating the second connector according to the present embodiment, wherein FIG. 7A is a plan view, and FIG. 7B is a side view.

FIGS. 9A, 9B, and 9C are three views illustrating the state where the first connector is mated with the second connector according to the present embodiment, wherein FIG. 9A is a plan view, FIG. 9B is a sectional view taken along an A-A line in FIG. 9A, and FIG. 9C is a sectional view taken along a B-B line in FIG. 9A.

DETAILED DESCRIPTION OF THE PREFERRED EMBODIMENTS

Embodiments will hereinafter be described in detail with reference to the drawings.

Figure 1:
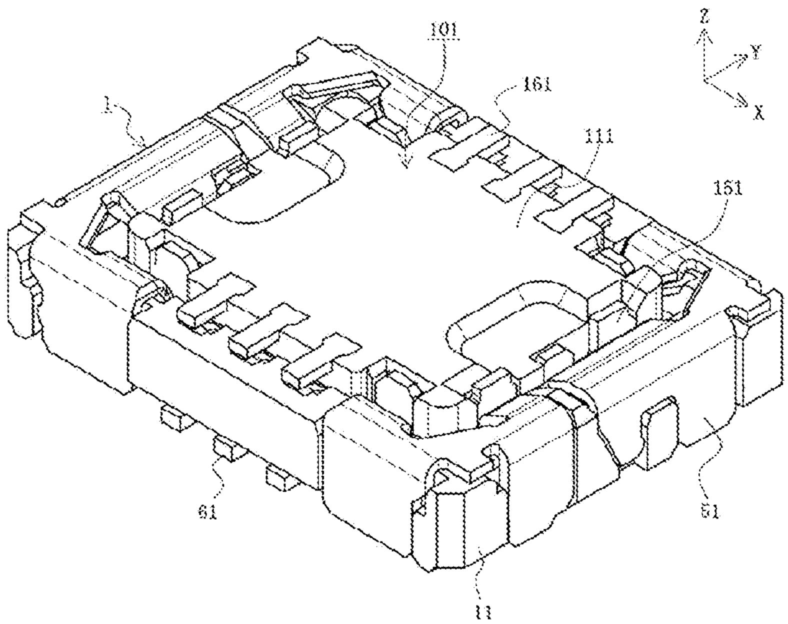
FIG. 1 is a perspective view illustrating the state where a first connector and a second connector are fitted together according to the present embodiment.
Figure 2:
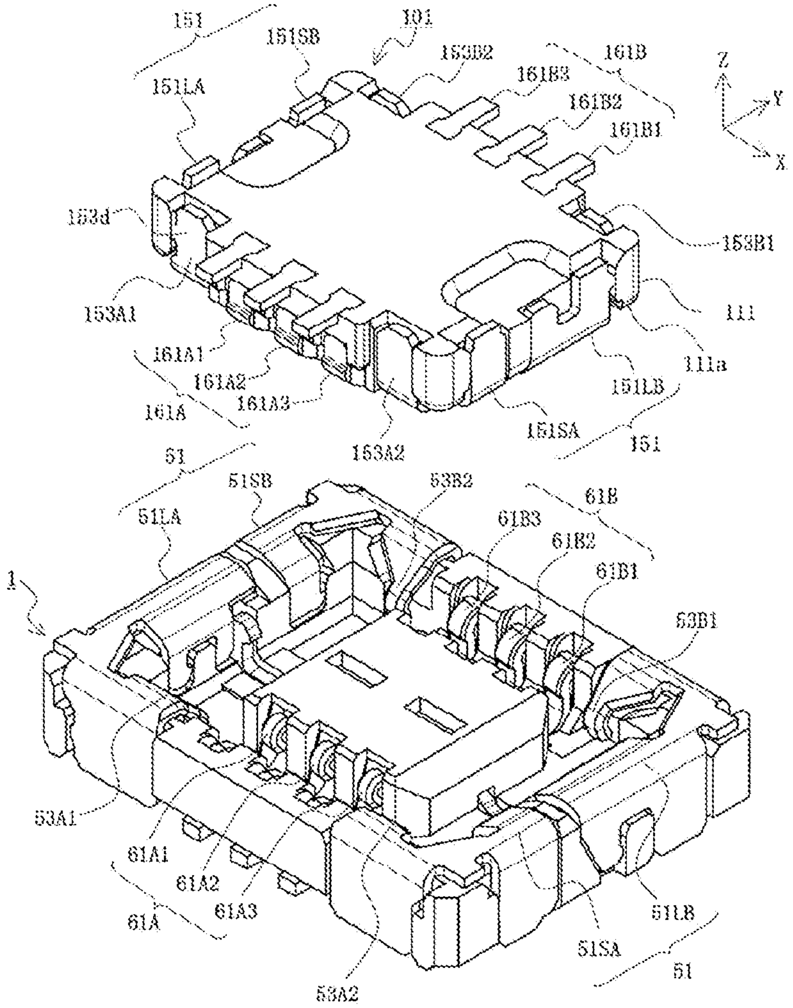
FIG. 2 is a perspective view illustrating the state before mating of the first connector with the second connector according to the present embodiment.
Figure 3A:
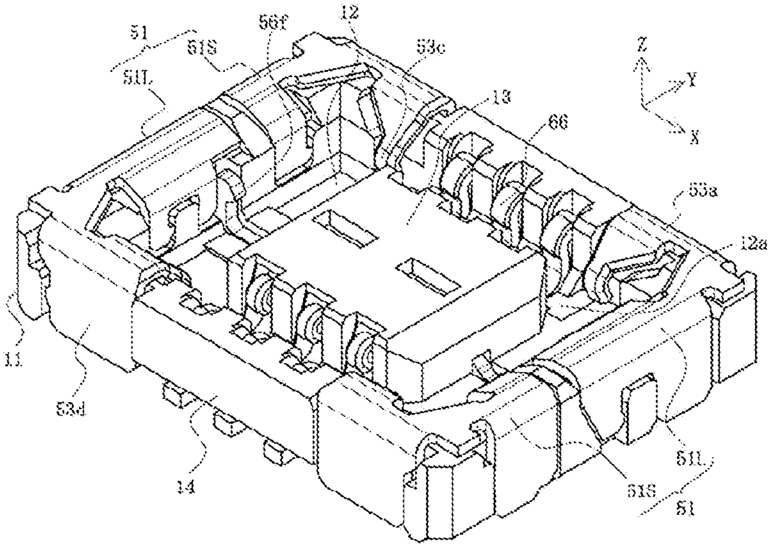
Figure 3B:
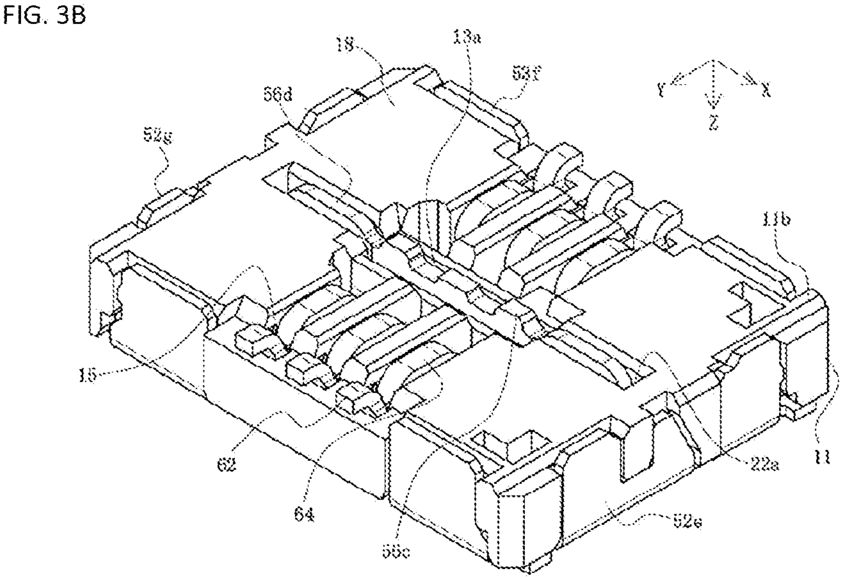
Figure 4A:
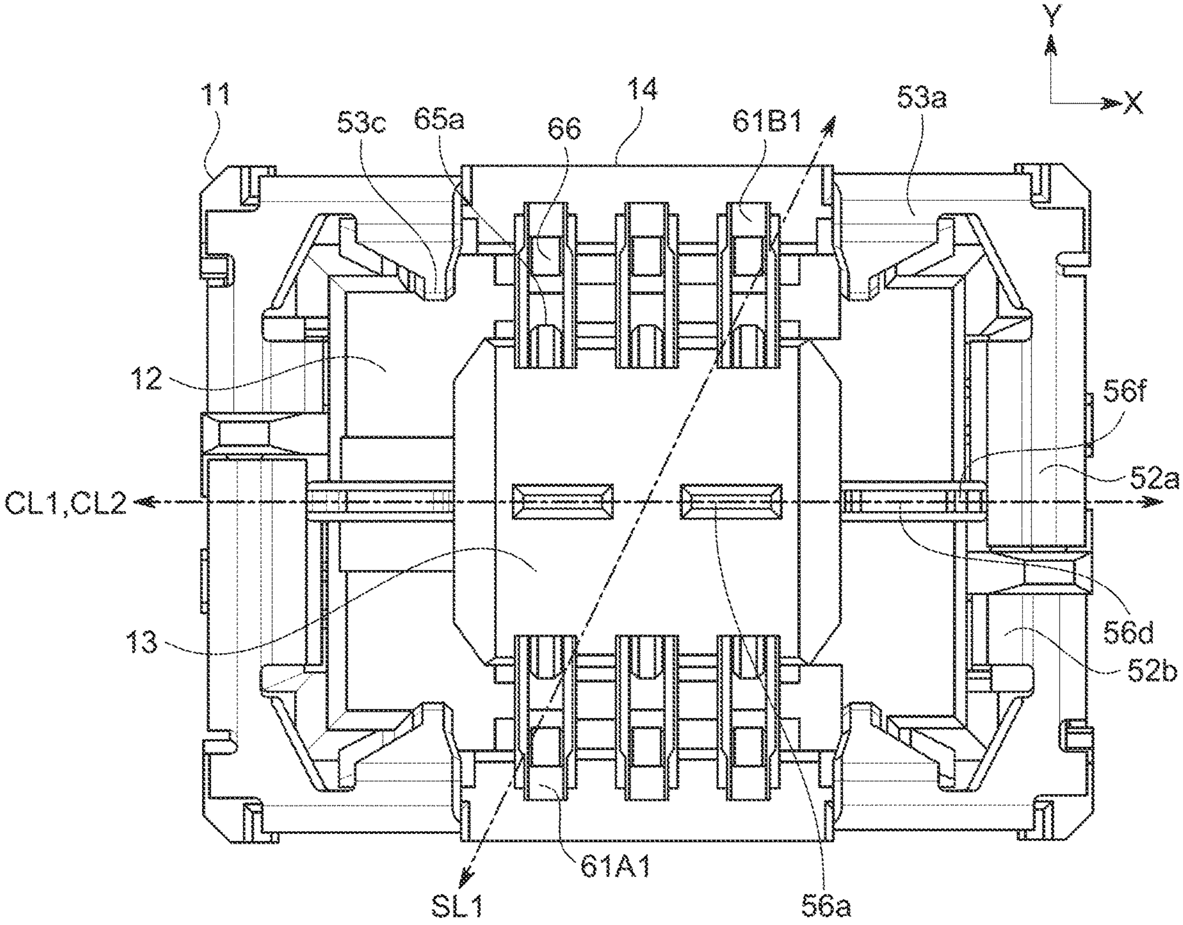
Figure 4B:
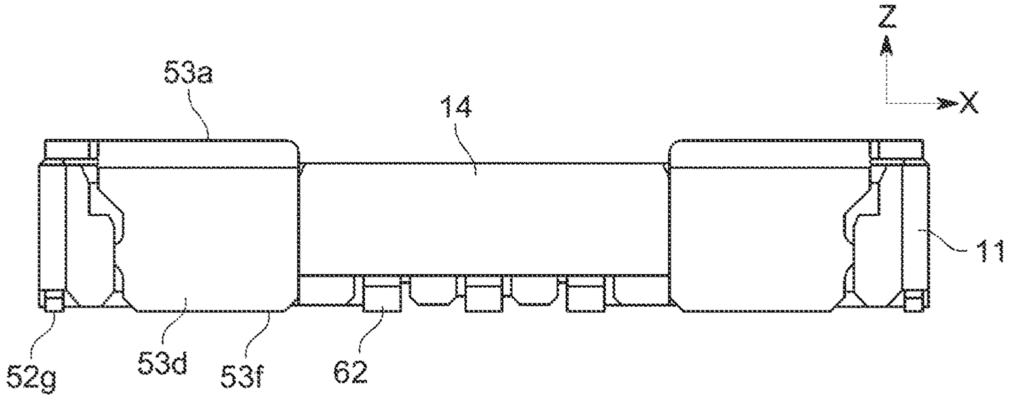
Figure 5:
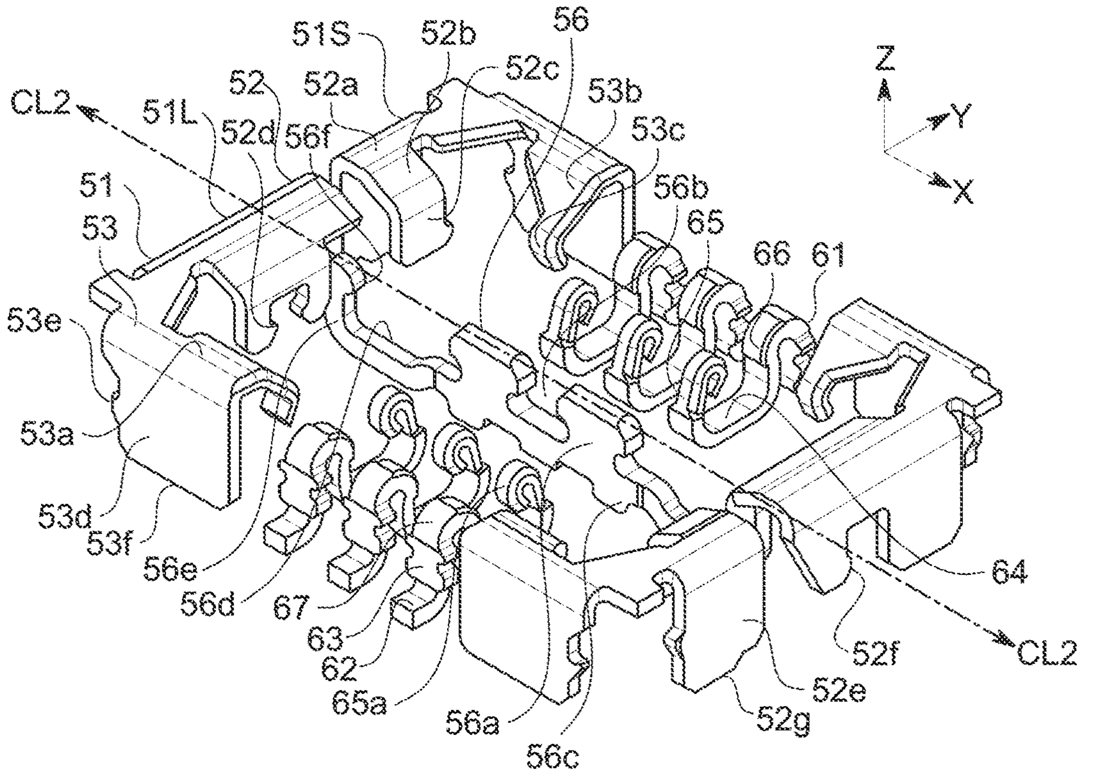
FIG. 5 is an exploded view of the first connector according to the present embodiment.
Figure 5:
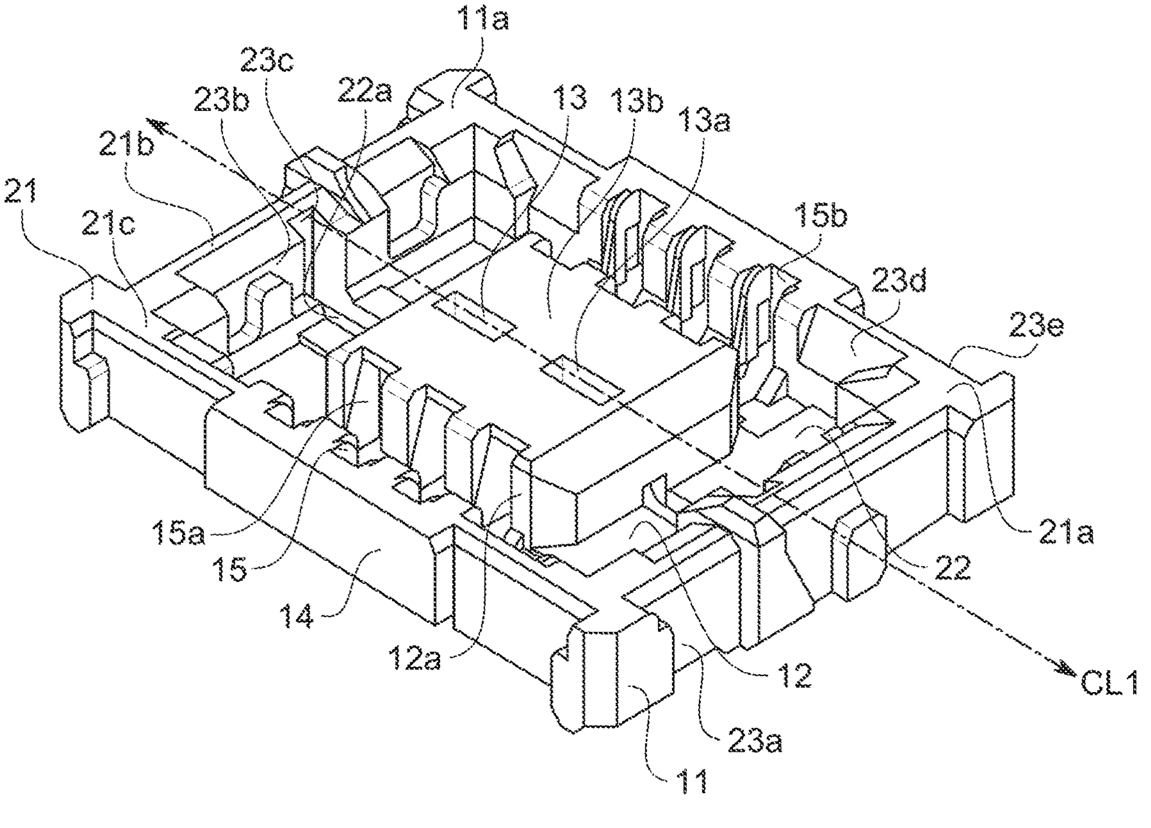

FIG. 1 is a perspective view illustrating the state where a first connector is mated with a second connector according to the present embodiment, FIG. 2 is a perspective view illustrating the state before mating of the first connector with the second connector according to the present embodiment, FIGS. 3A and 3B are perspective views illustrating the first connector according to the present embodiment, FIGS. 4A and 4B are two views illustrating the first connector according to the present embodiment, and FIG. 5 is an exploded view illustrating the first connector according to the present embodiment. Note that FIG. 3A is a perspective view when viewed from a fitting surface, FIG. 3B is a perspective view when viewed from a mounting surface, FIG. 4A is a plan view, and FIG. 4B is a side view.

In the figures, 101 is a connector according to the present embodiment, which is a second connector in one of a pair of connectors that is a connector assembly. The second connector 101 is a surface-mounted connector mounted on the surface of a second substrate that is a mounting member (not illustrated), and is fitted with a first connector 1 that is a counterpart connector. The first connector 1 is the other of the pair of connectors, and is a surface-mounted connector mounted on the surface of a first substrate that is a mounting member (not illustrated).

The first connector 1 and the second connector 101 according to the present embodiment are preferably used to electrically connect the first substrate to the second substrate, but can also be used to electrically connect other members. For example, the first substrate and the second substrate each are a printed circuit board, a flexible flat cable (FFC), a flexible circuit board (FPC) or the like, as used in electronic devices or the like, but may be any type of substrate.

In addition, in the present embodiment, expressions indicating direction such as top, bottom, left, right, front, rear, and the like used to describe a configuration and operation of each part of the first connector 1 and the second connector 101 are relative rather than absolute, and are proper when each part of the first connector 1 and the second connector 101 are in the positions illustrated in the drawings, however, these directions should be interpreted as being changed according to the change in position when the position thereof is changed.

The first connector 1 has a first housing 11 that is a counterpart connector body integrally formed of an insulating material such as synthetic resin. As illustrated in the figures, the first housing 11 has a substantially rectangular thick plate-like shape that is a substantially rectangular parallelepiped, and a first recess 12 fitted with a second housing 111 of the second connector 101, which is a substantially rectangular recess surrounded at the periphery thereof, on the side at which the second connector 101 is fitted, namely, on the side of a fitting surface 11*a* (the side in the negative Z-axis direction). Furthermore, a first protrusion 13 that is a middle island to be fitted with a below-mentioned recessed groove 113 formed on a fitting surface 111*a* of the second connector 101 is formed in the first recess 12 to be integral with the first housing 11.

Further, first side walls 14 that are counterpart side walls extending parallel to a first protrusion 13 and defining both sides of the first recess 12 are formed on both sides (the positive and negative Y-axis directions) of the first protrusion 13 integrally with the first housing 11. The first protrusion 13 and the first side walls 14 protrude upward (Z-axis negative direction) from a bottom plate 18 defining a bottom surface of the first recess 12, and extend in the longitudinal direction of the first housing 11. Consequently, as a part of the first recess 12, recessed grooves 12*a* that are elongated recesses extending in the longitudinal direction of the first housing 11 are formed on both sides of the first protrusion 13.

First terminal accommodating cavities 15 are formed from both side surfaces of the first protrusion 13 to bottom surfaces of the recessed grooves 12*a*. In the illustrated example, the first terminal accommodating cavities 15 pass through the bottom plate 18 in the plate-thickness direction (Z-axis direction). Note that, out of the first terminal accommodating cavities 15, recessed grooves formed on both side surfaces of the first protrusion 13 are referred to as first terminal accommodating inner cavities 15*a*, and recessed grooves formed on side surfaces of the first side walls 14, which are opposed to the first protrusion 13, are referred to as first terminal accommodating outer cavities 15*b*.

In the present embodiment, the plurality of (three in the illustrated example) first terminal accommodating cavities 15 are formed on both sides of the first protrusion 13 at a predetermined pitch so as to form two rows in the longitudinal direction of the first housing 11. The pitch and the number of the first terminal accommodating cavities 15 can be changed as appropriate. The same number of first terminals 61 as the first terminal accommodated cavities, which are counterpart terminals accommodated in the respective first terminal accommodating cavities 15 and loaded into the first housing 11, are also disposed on both sides of the first protrusion 13 at a similar pitch.

Note that, although the plurality of first terminals 61 disposed along the first side walls 14 are all the same, in the present embodiment, as illustrated in FIG. 2, an identifiable sign may be given thereto according to the disposed position for sake of convenience, and a description may be made using the sign. Moreover, note that the second terminals 161 of the second connector 101 are all the same, but like the first terminal 61, an identifiable sign may be given thereto according to the disposed position for sake of convenience, and a description may be made using the sign.

In the example illustrated in FIG. 2, the first terminals 61 located on the right side in the width direction (the Y-axis negative direction) of the first housing 11 are collectively referred to as first terminal 61A, and in the group of the first terminals 61A, a first terminal 61A1, a first terminal 61A2, and a first terminal 61A3 are individually described in the order from the near side in the longitudinal direction (X-axis negative direction side) of the first housing 11. Furthermore, the first terminals 61 located on the left side in the width direction (Y axis positive direction) of the first housing 11 are collectively referred to as first terminal 61B, and in the group of the first terminals 61B, the first terminal 61B1, the first terminal 61B2, and the first terminal 61B3 are individually described as a first terminal 61B1, a first terminal 61B2, and a first terminal 61B3 in the order from the back side in the longitudinal direction (X-axis negative direction side) of the first housing 11. Furthermore, for the second terminals 161, groups corresponding to the first terminals 61A and the first terminals 61B are collectively referred to as second terminal 161A and second terminals 161B, respectively, and in the group of second terminals 161A, terminals corresponding to the first terminal 61A1, the first terminal 61A2, and the first terminal 61A3 are individually referred to as a second terminal 161A1, a second terminal 161A2, and a second terminal 161A3, respectively, and in the group of second terminals 161B, terminals corresponding to the first terminal 61B1, first terminal 61B2 and first terminal 61B3 are individually referred to as a second terminal 161B1, a second terminal 161B2, and a second terminal 161B3, respectively.

The first terminal 61 is a member integrally formed by performing processing such as punching and bending on a conductive metal plate, and includes a held unit 63, a tail 62 connected to the lower end of the held unit 63, an upper connection unit 67 connected to the upper end of the held unit 63, an outer contact unit 66 connected to the lower end of the upper connection unit 67 and opposed to the held unit 63, a lower connection unit 64 connected to the lower end of the outer contact unit 66, and an inner connection unit 65 connected to an end of the lower connection unit 64 on the opposite side to the outer contact unit 66.

The held unit 63 is a portion that is fitted in and held by the first terminal accommodating outer cavity 15*b* while extending in the vertical direction (Z-axis direction), namely, in the thickness direction of the first housing 11. Note that the first terminal 61 is not necessarily attached to the first housing 11 by press fitting, but may be integrated with the first housing 11 by overmolding or insert molding. Here, for convenience of description, a case in which the held unit 63 is pressed into and held by the first terminal accommodating outer cavity 15*b* will be described.

The tail 62 is bent and connected to the held unit 63, extends in a left-right direction (Y-axis direction), namely, outward in the width direction of the first housing 11, and is connected to the connection pad coupled to the conductive trace of the first substrate by soldering or the like.

The upper connection unit 67 is a portion that is curved by about 180 degrees so as to protrude upward (Z-axis positive direction). The outer contact unit 66 extending downward (Z-axis negative direction) is connected to the lower end of the upper connection unit 67 on the opposite side to the held unit 63. A part of the outer contact unit 66 desirably protrudes inward in the width direction of the first housing 11.

The lower connection unit 64 is a portion including a substantially U-shaped side surface connected to the lower end of the outer contact unit 66. An inner contact unit 65*a* curved by about 180 degrees is connected to the upper end of the inner connection unit 65 so as to protrude upward and toward the outer contact unit 66.

The first terminal 61 is fitted in the first terminal accommodating cavity 15 from the side of the mounting surface 11*b* that is a lower surface (a surface in the Z-axis negative direction) of the first housing 11, and the held unit 63 is sandwiched from both the sides by the side walls of the first terminal accommodating outer cavity 15*b* formed on the inner side surface of the first side wall 14, whereby the first terminal 61 is fixed to the first housing 11. In this state, namely, in the state in which the first terminal 61 is loaded into the first housing 11, the inner contact unit 65*a* and the outer contact unit 66 are positioned on the right and left sides of the recessed groove 12*a* and face each other. In addition, when viewed from the longitudinal direction (X-axis direction) of the first housing 11, most of the held unit 63 is accommodated in the first terminal accommodating outer cavity 15*b*, and most of the inner contact unit 65*a* is accommodated in the first terminal accommodating inner cavity 15*a*. Furthermore, the lower surface of the tail 62 is positioned below the mounting surface 11*b* (the lower surface of the bottom plate 18).

The first terminal 61 is a member integrally formed by processing a metal plate, and thus has a certain degree of elasticity. As is clear from the shape, an interval between the inner contact unit 65*a* and the outer contact unit 66 facing each other can be elastically changed. That is, when the second terminal 161 included in the second connector 101 is inserted between the inner contact unit 65*a* and the outer contact unit 66, the interval between the inner contact unit 65*a* and the outer contact unit 66 is elastically elongated.

A first protrusion end 21 as a fitting guide is disposed on each of both longitudinal ends of the first housing 11. The fitting recess 22 is formed as part of the first recess 12 in each first protrusion end 21. The fitting recess 22 is a substantially rectangular recess, and is connected to both the ends in the longitudinal direction of each recessed groove 12*a*. In the state in which the first connector 1 and the second connector 101 are fitted together, a below-described second protrusion end 122 of second connector 101 is inserted in the fitting recess 22.

Furthermore, a shield plate accommodating slit 13*a*, which is a slit-shaped recessed groove extending in the longitudinal direction (X-axis direction) and the vertical direction (Z-axis direction) is formed in the center in the width direction (Y direction) of the first protrusion 13. The shield plate accommodating slit 13*a* continuously opens to the lower surface of the bottom plate 18 and opens to the upper surface of the first protrusion 13. Note that the portion of the shield plate accommodating slit 13*a* that opens to the upper surface of the first protrusion 13 is longitudinally bisected by a slit division unit 13*b*. The shield plate accommodating slit 13*a* is connected to a horizontal arm accommodating slit 22*a* formed in the bottom plate 18 of the fitting recess 22. The horizontal arm accommodating slit 22*a* is formed so as to penetrate through the bottom plate 18 in the thickness direction (Z-axis direction). Furthermore, the horizontal arm accommodating slit 22*a* is connected to a vertical arm accommodating slit 23*c* formed in a first end wall 21*b* of the first protrusion end 21.

The shield plate accommodating slit 13*a*, the horizontal arm accommodating slit 22*a*, and the vertical arm accommodating slit 23*c* accommodate and hold a shield plate 56 that is a band-like plate material extending in the thickness direction (Z-axis direction) and the lengthwise direction of the first housing 11, which is formed by performing machining such as punching on the conductive metal plate. The shield plate 56 includes a substantially rectangular body 56*a*, a held recess 56*b* recessed downward from an upper edge of the body 56*a*, and a plurality of lower protrusions 56*c* protruding downward from a lower edge of the body 56*a*, a pair of elongated horizontal arms 56*d* extending in the longitudinal direction of the first housing 11 from both ends in the longitudinal direction of the body 56*a*, vertical arms 56*e* extending upward (Z-axis positive direction) from distal ends of the elongated horizontal arms 56*d*, and engaging protrusions 56*f* protruding from the vicinity of the upper ends of the vertical arms 56*e* toward the body 56*a*. The elongated horizontal arm 56*d* and the vertical arm 56*e* are elastically deformable and function as spring members, so that the engaging protrusion 56*f* is resiliently displaceable away from the body 56*a*. Then, when the shield plate 56 is inserted into or press-fitted into the shield plate accommodating slit 13*a* from the lower surface side of the bottom plate 18, the slit division unit 13*b* relatively enters into and is engaged with the held recess 56*b*. As a result, the shield plate 56 is accommodated and held in the shield plate accommodating slit 13*a*. The elongated horizontal arm 56*d* and the vertical arm 56*e* are accommodated in the horizontal arm accommodating slit 22*a* and the vertical arm accommodating slit 23*c*, respectively.

Note that the shield plate 56 is not necessarily attached to the first housing 11 by insertion or press fit, and may be integrated with the first housing 11 by overmolding or insert molding. Here, for convenience of description, the case in which the shield plate is accommodated in the shield plate accommodating slit 13*a* and attached to the first housing 11 by insertion or press fitting is described.

When the shield plate 56 is attached to the first housing 11 in this way, the shield plate 56 is positioned between the two rows of first terminals 61 arranged along the left and right recessed grooves 12*a*, effectively preventing crosstalk between the two rows of first terminals 61. Note that, with the shield plate 56 attached to the first housing 11, on the side of the fitting surface 11*a*, the body 56*a* is positioned below the upper surface of the first protrusion 13, and the elongated horizontal arms 56*d* and the vertical arms 56*e* each do not protrude from the bottom plate 18 and the first end wall 21*b* into the fitting recess 22, however, at least tips of the engaging protrusions 56*f* protrude from the first end wall 21*b* into the fitting recess 22. However, the elongated horizontal arms 56*d* and the vertical arms 56*e* may protrude from the bottom plate 18 and the first end wall 21*b* into the fitting recess 22. Furthermore, on the side of the mounting surface 11*b*, the lower protrusions 56*c* and the elongated horizontal arms 56*d* do not protrude below the mounting surface 11*b* (the lower surface of the bottom plate 18).

The first protrusion end 21 includes first side wall extensions 21*c* that are counterpart fitting guide side walls extending in the longitudinal direction of the first housing 11 from both longitudinal ends of the first side wall 14, and a first end wall 21*b* extending in the width direction of the first housing 11, both ends of the first end wall 21*b* being connected to the first side wall extensions 21*c*. In each first protrusion end 21, the first end wall 21*b* and the first side wall extensions 21*c* connected to both the ends of the first end wall 21*b* form a continuous and substantially U-shaped side wall and define three sides of the substantially rectangular fitting recess 22. In the first end wall 21*b*, an outer end recess 23*a* is formed on the outer surface, and an inner end recess 23*b* is formed on the inner surface. In the first side wall extension 21*c*, an outer recess 23*e* is formed on the outer surface, and an inner recess 23*d* is formed on the inner surface.

A first reinforcing fitting 51 that is a counterpart reinforcing fitting is attached to the first housing 11. In the present embodiment, the first reinforcing fittings 51 are members integrally formed by performing processing such as punching or bending on the metal plate, are located on both longitudinal ends in the longitudinal direction (X-axis direction) of the first housing 11, and each include a first end wall covering unit 52 that covers the outside of the first end wall 21*b* of the first protrusion end 21, and a first side wall covering unit 53 that covers the first side wall extension 21*c*, which are substantially L-shaped in plan view.

Further, as illustrated in FIGS. 3A, 3B and 5, the first reinforcing fitting 51 includes a large first reinforcing fitting 51L in which the first end wall covering unit 52 covers a region of a half of the first end wall 21*b* or more, and a small first reinforcing fitting 51S in which the first end wall covering unit 52 covers a region less than a half of the first end wall 21*b*. Note that, for the first side wall covering unit 53, the large first reinforcing fitting 51L and the small first reinforcing fitting 51S have similar dimensions and configurations, and for the first end wall covering unit 52, the large first reinforcing fitting 51L and the small first reinforcing fitting 51S have almost similar dimensions and configurations except for the dimensions of the first housing 11 in the width direction. Therefore, when the large first reinforcing fitting 51L and the small first reinforcing fitting 51S are collectively described, they are described as merely the first reinforcing fitting 51.

Note that the pair of large first reinforcing fittings 51L and the pair of small first reinforcing fittings 51S are disposed to be opposed to each other on a diagonal of the substantially rectangular first housing 11 in plan view. Moreover, the large first reinforcing fittings 51L are all the same, and the small first reinforcing fittings 51S are all the same. Note that in the present embodiment, as illustrated in FIG. 2, an identifiable sign may be given depending on the disposed position for sake of convenience, and a description may be made using the sign. Additionally, it should be noted that, for the second reinforcing fitting 151 of the second connector 101, like the first reinforcing fitting 51, an identifiable sign may be given thereto depending on the disposed position for sake of convenience, and a description may be made using the sign.

In the example illustrated in FIG. 2, out of the first reinforcing fitting 51 located on the right side in the width direction (the Y-axis negative direction) of the first housing 11, the reinforcing fitting located at a corner on the near side in the longitudinal direction (X-axis negative direction side) of the first housing 11 is the large first reinforcing fitting 51L, which is referred to as first reinforcing fitting 51LA, and the reinforcing fitting located at a corner on the back side in the longitudinal direction (X-axis positive direction side) of the first housing 11 is the small first reinforcing fitting 51S, which is referred to as first reinforcing fitting 51SA. Furthermore, out of the first reinforcing fitting 51 located on the left side in the width direction (the Y-axis positive direction) of the first housing 11, the reinforcing fitting located at a corner on the near side in the longitudinal direction of the first housing 11 is the small first reinforcing fitting 51S, which is referred to as first reinforcing fitting 51SB, and the reinforcing fitting located at a corner on the back side in the longitudinal direction of the first housing 11 is the large first reinforcing fitting 51L, which is referred to as first reinforcing fitting 51LB. Furthermore, the second reinforcing fittings 151 corresponding to the first reinforcing fitting 51LA, the first reinforcing fitting 51SA, the first reinforcing fitting 51SB, and the first reinforcing fitting 51LB are referred to as a second reinforcing fitting 151LA, a second reinforcing fitting 151SA, a second reinforcing fitting 151SB, and a second reinforcing fitting 151LB, respectively.

The first end wall covering unit 52 includes an upper surface portion 52*a* that extends in a width direction of the first housing 11 and covers an upper surface 21*a* of the first end wall 21*b*, an inclined inner cover portion 52*b* as a guiding portion extending obliquely downward from the inner edge of the first end wall 21*b* on the upper surface portion 52*a*, a vertical inner cover portion 52*c* that extends downward from a lower end of the inclined inner cover portion 52*b*, an engaging projection 52*d* that protrudes from a side edge of the vertical inner cover portion 52*c*, an outer cover portion 52*e* that extends downward from the outer edge of the first end wall 21*b* on the upper surface portion 52*a*, an engaging projection 52*f* that protrudes from the side edge of the outer cover portion 52*e*, and a connecting foot 52*g* at the lower end of the outer cover portion 52*e*.

The first side wall covering unit 53 includes an upper surface portion 53*a* that extends in the longitudinal direction of the first housing 11 and covers the upper surface 21*a* of the first side wall extension 21*c*, an inclined elastic arm 53*b* that is a counterpart reinforcing fitting terminal extending diagonally downward from the inner edge of the first side wall extension 21*c* on the upper surface portion 53*a*, a contact protrusion 53*c* that bulges toward the center of the fitting recess 22 in the vicinity of the lower end of the inclined elastic arm 53*b*, an outer cover portion 53*d* that extends downward from an outer edge of the first side wall extension 21*c* on the upper surface portion 53*a*, an engaging projection 53*e* that protrudes from a side edge of the outer cover portion 53*d*, and a connecting foot 53*f* at the lower end of the outer cover portion 53*d*.

The inclined inner cover portion 52*b*, the vertical inner cover portion 52*c*, the outer cover portion 52*e*, and the outer cover portion 53*d* in the first reinforcing fitting 51 are inserted or press-fitted into the inner end recess 23*b* and the outer end recess 23*a* of the first end wall 21*b* and the outer recess 23*e* of the first side wall extension 21*c* from the side of the fitting surface 11*a* that is the upper surface (the surface in the Z-axis positive direction) of the first housing 11, and attached to the first housing 11. Note that the first reinforcing fitting 51 is not necessarily attached to the first housing 11 by insertion or press fit, and may be integrated with the first housing 11 by overmolding or insert molding. Here, for convenience of description, the case in which the shield plate is attached to the first housing 11 by insertion or press fitting is described.

Moreover, with the first reinforcing fitting 51 attached to the first housing 11, the upper surface portion 52*a* of the first end wall covering unit 52 covers a majority of the upper surface 21*a* of the first end wall 21*b*. The end wall inner cover portion 52*b* and the vertical inner cover portion 52*c* are at least partially accommodated in the inner end recess 23*b*, the engaging projection 52*d* enters into a part of the side surface of the inner end recess 23*b* and engages therewith, the outer cover portion 52*e* is at least partially accommodated in the outer end recess 23*a*, the engaging projection 52*f* enters into a part of the side surface of the outer end recess 23*a* and engages therewith, and the lower surface of the connecting foot 52*g* is positioned below the mounting surface 11*b* (the lower surface of the bottom plate 18) and is substantially flush with the lower surface of the tail 62 of the first terminal 61. Also, the upper surface portion 53*a* of the first side wall covering unit 53 covers a majority of the upper surface 21*a* of the first side wall extension 21*c*, the inclined elastic arm 53*b* is accommodated in the inner recess 23*d* with at least a portion thereof spaced apart from a bottom surface of the inner recess 23*d*, the contact protrusion 53*c* is elastically displaceable toward the first side wall extension 21*c*, the outer cover portion 53*d* is at least partially accommodated in the outer recess 23*e*, the engaging projection 53*e* enters into a part of the side surface of the outer recess 23*e* and engages therewith, and the lower surface of the connecting foot 53*f* is positioned below the mounting surface 11*b* and is substantially flush with the lower surface of the tail 62 of the first terminal 61.

As described above, since the majority of the surfaces of the first end wall 21*b* and the first side wall extension 21*c* are covered with the first reinforcing fitting 51, the strength of the first end wall 21*b* and the first side wall extension 21*c* increases. Thus, even when a force or impact is applied to the first end wall 21*b* and the first side wall extension 21*c* in the operation of fitting the first connector 1 and the second connector 101 together, damage or deformation of the first end wall 21*b* and the first side wall extension 21*c* can be reliably prevented.

Note that the upper surface portion 52*a* of the first end wall covering unit 52 of the large first reinforcing fitting 51L extends toward the first side wall extension 21*c* on the opposite side, and the distal end thereof reaches a position beyond the center of the first housing 11 in the width direction. Thus, the vertical arm 56*e* of the shield plate 56 disposed at the center of the first housing 11 in the width direction is positioned below the upper surface portion 52*a* of the first end wall covering unit 52 of the large first reinforcing fitting 51L. However, the vertical arm 56*e* of the shield plate 56 does not contact or interfere with any portion of the first reinforcing fitting 51. As described above, since the first reinforcing fitting 51 attached to both longitudinal ends of the first housing 11, and the shield plate 56 that extends in the longitudinal direction of the first housing 11 and reaches the first end walls 21*b* at both ends of the first housing 11 are independent from each other, the first housing 11 can deform somewhat flexibly as a whole, and be prevented from breaking or deforming at application of a force or impact.

The inclined elastic arm 53*b* is elastically deformable, and the contact protrusion 53*c* formed near the tip of the inclined elastic arm 53*b* functions as a terminal in contact with the outer cover portion 153*d* of the second reinforcing fitting 151 for electrical conduction. In other words, the inclined elastic arm 53*b* has the same function as the first terminal 61. Thus, it should be noted that, for the inclined elastic arm 53*b* like the first terminal 61, as illustrated in FIG. 2, an identifiable sign may be given thereto depending on the disposed position, and a description may be made using the sign.

In the example illustrated in FIG. 2, the inclined elastic arms 53*b* located on the right side of the first housing 11 in the width direction are individually referred to as a first reinforcing fitting terminal 53A1 and a first reinforcing fitting terminal 53A2 in the order from the near side in the longitudinal direction of the first housing 11. The inclined elastic arms 53*b* located on the left side in the width direction of the first housing 11 are individually referred to as a first reinforcing fitting terminal 53B1 and a first reinforcing fitting terminal 53B2 in the order from the back side in the longitudinal direction of the first housing 11. Furthermore, in the outer cover portion 153*d* of the second reinforcing fitting 151, fittings corresponding to the first reinforcing fitting terminal 53A1 and the first reinforcing fitting terminal 53A2, and the first reinforcing fitting terminal 53B1 and the first reinforcing fitting terminal 53B2 are referred to as a second reinforcing fitting terminal 153A1 and a second reinforcing fitting terminal 153A2, and a second reinforcing fitting terminal 153B1 and a second reinforcing fitting terminal 153B2, respectively.

Similar to the tail 62 of the first terminal 61, the connecting foot 52*g* of the first end wall covering unit 52 and the connecting foot 53*f* of the first side wall covering unit 53 are connected to the connection pad connected to the conductive trace of the first substrate by soldering or the like. As a result, similar to the first terminal 61, the inclined elastic arm 53*b* of the first reinforcing fitting 51 can also function as a terminal for transmitting a current or electrical signal, and the number of poles of the first connector 1 can be increased without increasing the number of first terminals 61, reducing the first connector 1 in size. In addition, because the shield plate 56 extending in the longitudinal direction of the first housing 11 is disposed between two rows of first terminals 61 in the width direction of the first housing 11, crosstalk between the two rows of first terminals 61 is effectively prevented.

Next, the configuration of the second connector 101 will be described.

Figure 6A:
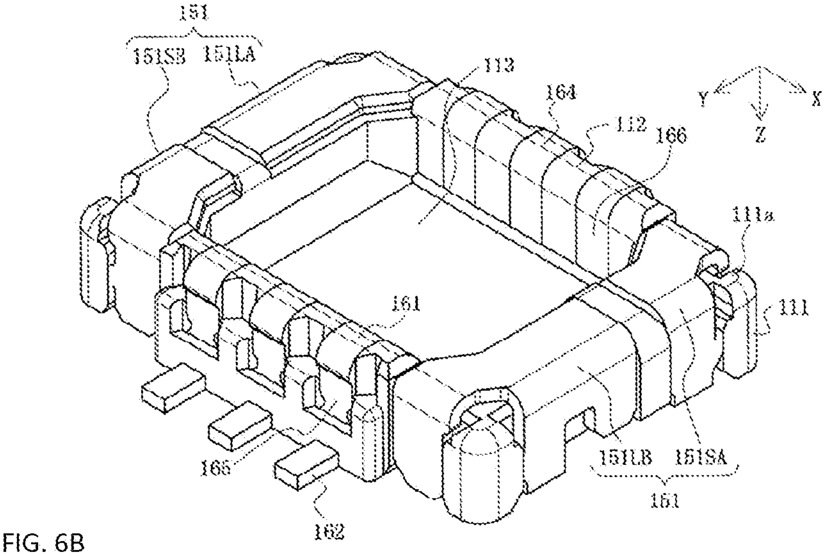
Figure 6B:
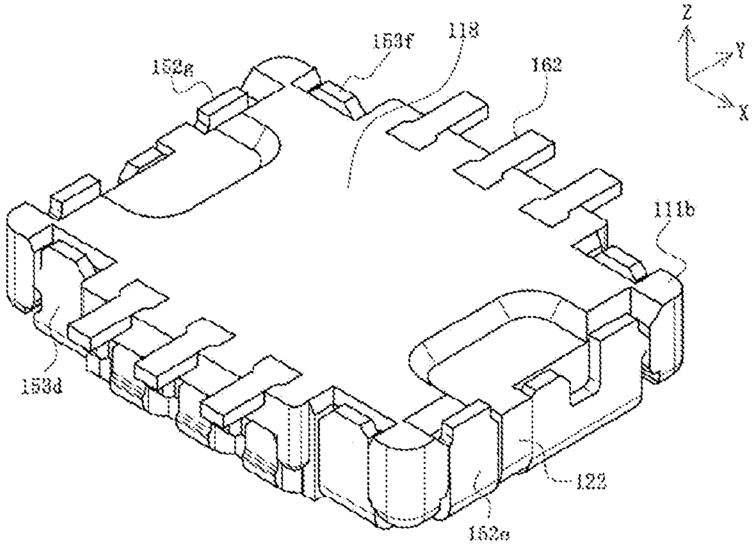
Figure 7A:
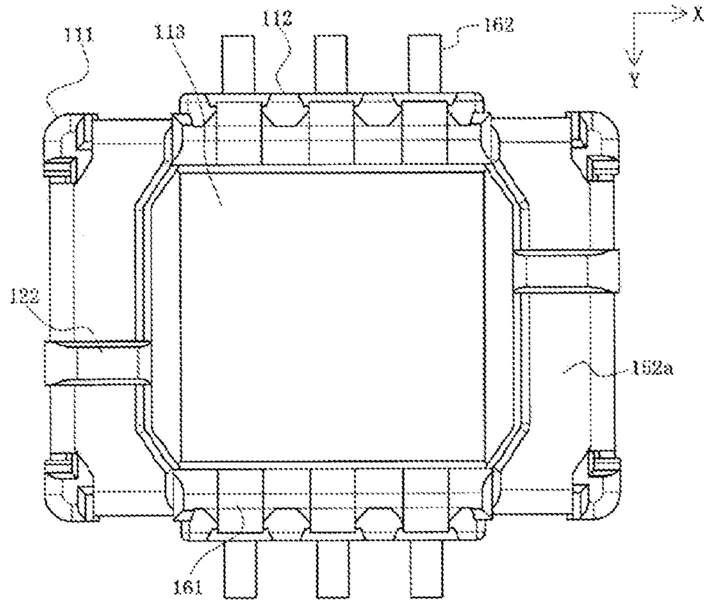
Figure 7B:
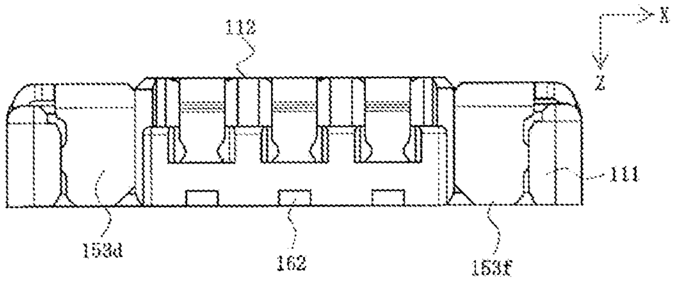
Figure 8:
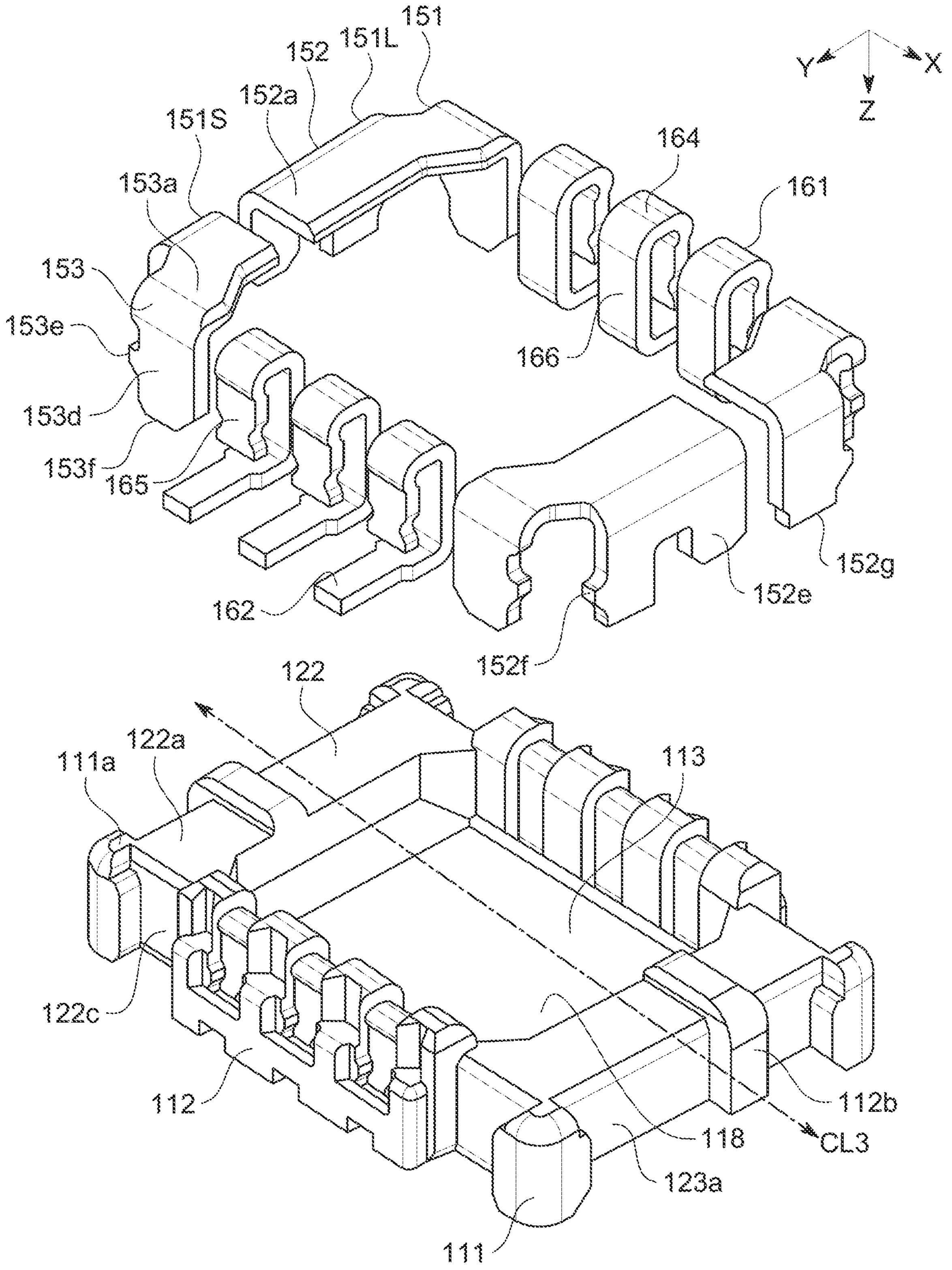
FIG. 8 is an exploded view of the second connector according to the present embodiment.

FIGS. 6A and 6B are perspective views illustrating the second connector according to the present embodiment, FIGS. 7A and 6B are two views illustrating the second connector according to the present embodiment, and FIG. 8 is an exploded view illustrating the second connector according to the present embodiment. Note that FIG. 6A is a perspective view when viewed from the fitting surface, FIG. 6B is a perspective view when viewed from the mounting surface, FIG. 7A is a plan view, and FIG. 7B is a side view.

The second connector 101 that is a connector according to the present embodiment has a second housing 111 that is a connector body integrally formed of an insulating material such as synthetic resin. As illustrated in the figure, the second housing 111 has a substantially rectangular thick plate-like shape that is a substantially rectangular parallelepiped. A recessed groove 113 that extends in the longitudinal direction (X-axis negative direction) of the second housing 111, second side walls 112 that are elongated protrusions defining both sides of the recessed groove 113 in the width direction (Y-axis direction) and extending in the longitudinal direction of the second housing 111, and second protrusion ends 122 that define both ends of the recessed groove 113 in the longitudinal direction (X-axis direction) and extend in the width direction (Y-axis direction) to function as fitting guides coupling both longitudinal ends of the second side wall 112 are integrally formed on the side fitted into the first connector 1 of the second housing 111, namely, on the side of the fitting surface 111*a* (the side in the Z-axis negative direction).

The second side walls 112 are formed along both sides of the recessed groove 113 and along both sides of the second housing 111. The second terminals 161 as terminals are disposed on each of the second side walls 112. The same number of second terminals 161 as the first terminals 61 are disposed at a pitch corresponding to the first terminals 61. In the recessed groove 113, the side mounted on the second substrate, namely, the side of the mounting surface (the side of the Z-axis negative direction) is closed with a bottom plate 118.

The second terminal 161 is a member integrally formed by performing processing such as punching and bending on a conductive metal plate, and as illustrated in FIG. 8, includes an outer contact unit 165, an upper connection unit 164 connected to the upper end (end in the Z-axis negative direction) of the outer contact unit 165, an inner contact unit 166 that is connected to the upper connection unit 164 at the upper end thereof and extends in parallel to the outer contact unit 165, and a tail 162 connected to the lower end (end in the Z-axis positive direction) of the inner contact unit 166.

Note that, although the plurality of second terminals 161 disposed along each second side walls 112 are all the same, similar to the first terminals 61, in the present embodiment, as illustrated in FIG. 2, an identifiable sign may be given thereto according to the disposed position for sake of convenience, and a description may be made using the sign.

The second terminals 161 may be integrated with the second housing 111 by overmolding or insert molding. That is, the second housing 111 is molded by filling a cavity of a mold in which the second terminals 161 are set in advance with an insulating material such as a synthetic resin. As a result, the second terminals 161 are at least partially embedded in the second housing 111 and are integrally attached to the second housing 111. Note that the second terminal 161 is not necessarily integrated with the second housing 111 by overmolding or insert molding, but may be attached to the second housing 111 by press fitting or the like. Here, for convenience of description, a case in which the second housing 111 is integrated by overmolding or insert molding will be described.

The outer contact unit 165 is at least partially exposed on a surface of the second side wall 112, which faces the outer side of the second housing 111 in the width direction. Furthermore, the upper connection unit 164 is exposed on the upper surface (Z-axis negative direction) of the second side wall 112, and is substantially flush with the surface. Furthermore, the inner contact unit 166 is exposed on the surface facing the inner side of the second housing 111 in the width direction, and is substantially flush with the surface. The tail 162 extends from the lower end of the surface facing the outer side of the second side wall 112 in the width direction of the second housing 111 toward the outer side of the second housing 111 in the width direction, and is connected to a connection pad coupled to a conductive trace of the second substrate by soldering or the like.

Further, in the second protrusion end 122, a recessed outer end recess 123*a* is formed on an end side surface 122*b* that faces outward in the longitudinal direction of the second housing 111, and a recessed outer recess 123*e* is formed on a side surface 122*c* that faces outward in the width direction of the second housing 111.

A second reinforcing fitting 151 that is a reinforcing fitting mounted thereto is attached to the second housing 111. In the present embodiment, the second reinforcing fittings 151 are members integrally formed by performing processing such as punching or bending on the metal plate, and are located at both longitudinal ends of the second housing 111, and each include a second end wall covering unit 152 that covers a majority of the upper surface 122*a* and the end side surface 122*b* of the second protrusion end 122, and a second side wall covering unit 153 that is connected to the side end of the second end wall covering unit 152 and covers a majority of the side surface 122*c*.

Further, as illustrated in FIGS. 6A, 6B and 8, the second reinforcing fitting 151 includes a large second reinforcing fitting 151L in which the second end wall covering unit 152 covers a region of a half of the second protrusion end 122 or more, and a small second reinforcing fitting 151S in which the second end wall covering unit 152 covers a region less than a half of the second protrusion end 122. Note that, for the second side wall covering unit 153, the large second reinforcing fitting 151L and the small second reinforcing fitting 151S have similar dimension and configuration, and for the second end wall covering unit 152, the large second reinforcing fitting 151L and the small second reinforcing fitting 151S have almost similar dimensions and configurations except for the dimensions of the second housing 111 in the width direction. Therefore, when the large second reinforcing fitting 151L and the small second reinforcing fitting 151S are collectively described, they are described as merely the second reinforcing fitting 151.

Note that the pair of large second reinforcing fittings 151L and the pair of small second reinforcing fittings 151S are disposed to be opposed to each other on a diagonal of the substantially rectangular second housing 111 in plan view. Moreover, the large second reinforcing fittings 151L are all the same, and the small second reinforcing fittings 151S are all the same. Note that in the present embodiment, as illustrated in FIG. 2, an identifiable sign may be given depending on the disposed position for sake of convenience, and a description may be made using the sign. As illustrated in FIG. 2, in the state where the fitting surface 111*a* of the second connector 101 faces the fitting surface of the first connector 1, the large second reinforcing fitting 151L and the small second reinforcing fitting 151S are disposed so as to face the large first reinforcing fitting 51L and the small first reinforcing fitting 51S of the first connector 1, respectively.

The second end wall covering unit 152 includes an upper surface portion 152*a* that extends in the width direction of the second housing 111 and covers the upper surface 122*a* of the second protrusion end 122, an outer cover portion 152*e* that extends downward from the outer edge of the second protrusion end 122 on the upper surface portion 152*a*, an engaging projection 152*f* that protrudes from the side edge of the outer cover portion 152*e*, and a connecting foot 152*g* at a lower end of the outer cover portion 152*e*.

The second side wall covering unit 153 includes an upper surface portion 153*a* that extends in the longitudinal direction of the second housing 111 and covers the vicinity of the side edge of the upper surface 122*a* of the second protrusion end 122, an outer cover portion 153*d* that extends downward from the side edge of the second side wall covering unit 153 on the upper surface portion 153*a*, an engaging projection 153*e* that protrudes from the side edge of the outer cover portion 153*d*, and a connecting foot 153*f* at the lower end of the outer cover portion 153*d*.

The outer cover portion 152*e* and the outer cover portion 153*d* in the second reinforcing fitting 151 are inserted or press-fitted into the outer end recess 123*a* and the outer recess 123*e* of the second protrusion end 122 from the side of the fitting surface 111*a* that is the upper surface (the surface in the Z-axis negative direction) of the second housing 111, and attached to the second housing 111. Note that the second reinforcing fitting 151 is not necessarily attached to the second housing 111 by insertion or press fit, and may be integrated with the second housing 111 by overmolding or insert molding. Here, for convenience of description, the case in which the shield plate is attached to the second housing 111 by insertion or press fitting is described.

With the second reinforcing fitting 151 attached to the second housing 111, the upper surface portion 152*a* of the second end wall covering unit 152 covers a majority of the upper surface 122*a* of the second protrusion end 122, the outer cover portion 152*e* is at least partially accommodated in the outer end recess 123*a*, the engaging projection 152*f* enters into a part of the side surface of the outer end recess 123*a* and engages therewith, and the lower surface of the connecting foot 152*g* is flush with or below the mounting surface 111*b*, that is, the lower surface (surface in the Z-axis positive surface) of the bottom plate 118 and is substantially flush with the lower surface of the tail 162 of the second terminal 161. In addition, the upper surface portion 153*a* of the second side wall covering unit 153 covers the vicinity of the side edge of the upper surface 122*a* of the second protrusion end 122, the outer cover portion 153*d* is at least partially accommodated in the outer recess 123*e*, the engaging projection 153*e* enters into a part of the side surface of the outer recess 123*e* and engages therewith, and the lower surface of the connecting foot 153*f* is flush with or below the mounting surface 111*b* and is substantially flush with the lower surface of the tail 162 of the second terminal 161.

As described above, since a majority of the surface of the second protrusion end 122 is covered with the second reinforcing fitting 151, the strength of the second protrusion end 122 increases, and even when a force or impact is applied to the second protrusion end 122 in the operation of fitting the first connector 1 and the second connector 101 together, damage or deformation of the second protrusion end 122 can be reliably prevented.

The upper surface portion 152*a* and the outer cover portion 152*e* of the second end wall covering unit 152 of the large second reinforcing fitting 151L extend toward the second side wall 112 on the opposite side, and the distal ends thereof are positioned beyond the center of the second housing 111 in the width direction and reach to a position similar to the distal end of the upper surface portion 52*a* of the first end wall covering unit 52 in the large first reinforcing fitting 51L of the first connector 1. Thus, as illustrated in FIG. 1, when the second connector 101 and the first connector 1 are fitted together, the outer cover portion 152*e* of the large second reinforcing fitting 151L faces the vertical arm 56*e* of the shield plate 56 disposed at the center of the first housing 11 in the width direction, and engages with and comes into contact with the engaging protrusion 56*f* of the vertical arm 56*e*.

Similar to the tail 162 of the second terminal 161, the connecting foot 152*g* of the second end wall covering unit 152 and the connecting foot 153*f* of the second side wall covering unit 153 are connected to the connection pad connected to the conductive trace of the second substrate by soldering or the like. As a result, similar to the second terminal 161, the outer cover portion 153*d* of the second reinforcing fitting 151 can also function as a terminal for transmitting a current or electrical signal, and the number of poles of the second connector 101 can be increased without increasing the number of second terminals 161, reducing the second connector 101 in size. Note that, although the outer cover portions 153*d* are all the same, in the present embodiment, as illustrated in FIG. 2, an identifiable sign may be given thereto according to the disposed position for sake of convenience, and a description may be made using the sign.

Subsequently, the operation of mating together the first connector 1 and the second connector 101 with the above configuration will be described.

Figure 9A:
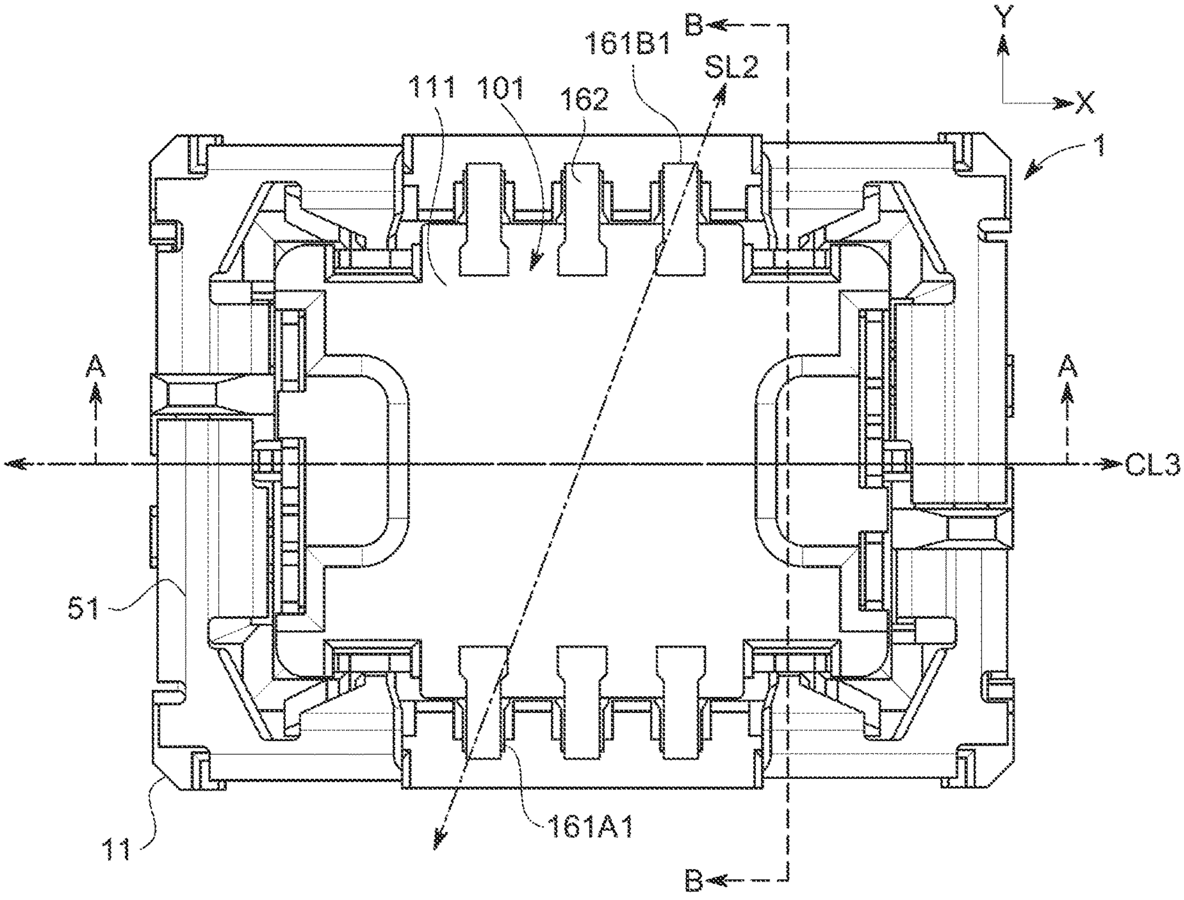
Figure 9B:
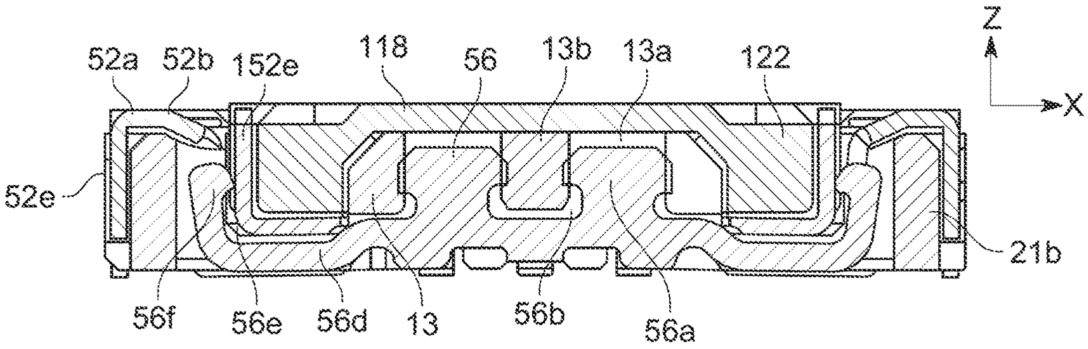
Figure 9C:
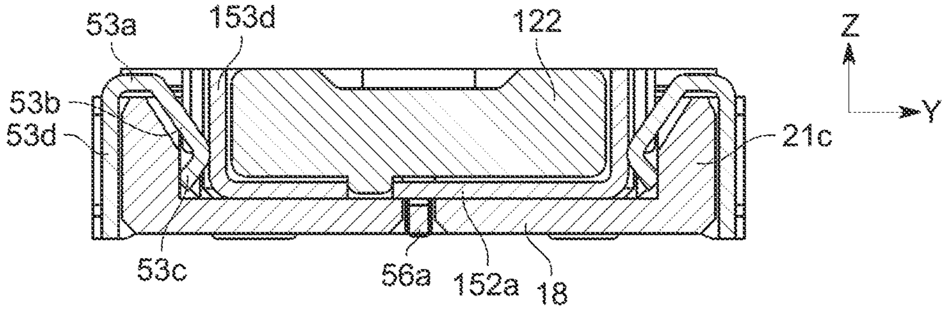
Figure 10:
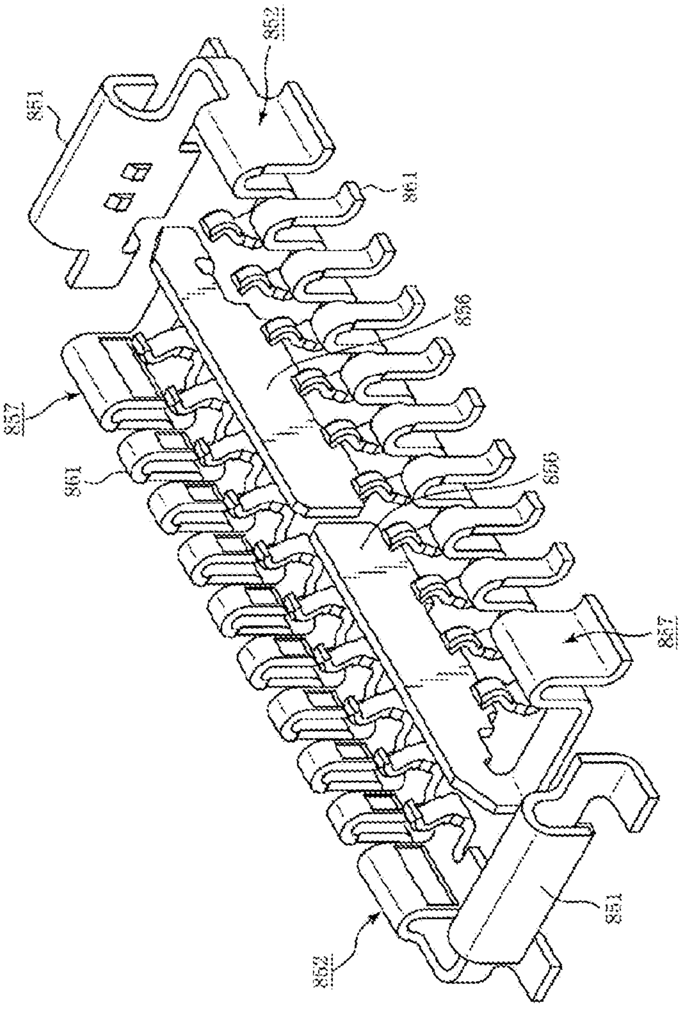
FIG. 10 is a perspective view illustrating known terminals and shield members.

FIGS. 9A, 9B, and 9C are three views illustrating the state where the first connector is mated with the second connector according to the present embodiment. Note that FIG. 9A is a plan view, FIG. 9B is a cross sectional view taken along a line A-A in FIG. 9A, and FIG. 9C is a cross sectional view taken along a line B-B in FIG. 9A.

Here, the first connector 1 is surface-mounted to the first substrate by connecting the tail 62 of the first terminal 61 to the connection pad coupled to the conductive trace of the first substrate (not illustrated), and connecting lower ends of the connecting foot 52*g* of the first end wall covering unit 52 and the connecting foot 53*f* of the first side wall covering unit 53 in the first reinforcing fitting 51 to the connection pad coupled to the conductive trace of the first substrate by soldering or the like. Similarly, the second connector 101 is surface-mounted to the second substrate by connecting the tail 162 of the second terminal 161 to the connection pad coupled to the conductive trace of the second substrate (not illustrated), and connecting lower ends of the connecting foot 152*g* of the second end wall covering unit 152 and the connecting foot 153*f* of the second side wall covering unit 153 in the second reinforcing fitting 151 to the connection pad coupled to the conductive trace of the second substrate by soldering or the like.

First, the operator opposes the fitting surface 11*a* of the first housing 11 of the first connector 1 to the fitting surface 111*a* of the second housing 111 of the second connector 101, as illustrated in FIG. 2, matches the position of the second side wall 112 of the second connector 101 with the position of the corresponding recessed groove 12*a* of the first connector 1, and matches the position of the second protrusion end 122 of the second connector 101 with the position of the corresponding fitting recess 22 of the first connector 1, thereby completing the positioning of the first connector 1 and the second connector 101.

In this state, when the first connector 1 and/or the second connector 101 is moved in a direction approaching the counterpart, that is, in the fitting direction (Z-axis direction), the second side wall 112 and the second protrusion end 122 of the second connector 101 are inserted into the recessed groove 12*a* and the fitting recess 22 of the first connector 1. Consequently, as illustrated in FIGS. 1 and 9A-9C, when the fitting between the first connector 1 and the second connector 101 is completed, the first terminal 61 and the second terminal 161 enter into a conduction state, and the first reinforcing fitting 51 and the second reinforcing fitting 151 enter into a conduction state.

Specifically, when the corresponding second terminal 161 is inserted between the inner contact unit 65*a* and the outer contact unit 66 of each first terminal 61, the inner contact unit 65*a* of the first terminal 61 and the inner contact unit 166 of the second terminal 161 come into contact with each other, and the outer contact unit 66 of the first terminal 61 and the outer contact unit 165 of the second terminal 161 come into contact with each other. As a result, since the first terminal 61 and the corresponding second terminal 161 come into contact with each other at two locations, that is, are in a so-called multiple contact state, even when one contact is separated due to shock or vibration, the conduction state can be maintained.

Furthermore, as illustrated in FIG. 9*c*, the contact protrusion 53*c* of the inclined elastic arm 53*b* of each first reinforcing fitting 51 engages and comes into contact with the outer cover portion 153*d* of the corresponding second reinforcing fitting 151. As a result, even when the first reinforcing fitting 51 and the corresponding second reinforcing fitting 151 are subjected to shock or vibration, the elastically displaceable contact protrusion 53*c* maintains contact with the outer cover portion 153*d* such that the conduction state can be maintained.

Furthermore, as illustrated in FIG. 9B, the shield plate 56 is at least partially accommodated in the recessed groove 113, and the engaging protrusion 56*f* of the vertical arm 56*e* engages and comes into contact with the outer cover portion 152*e* of the large second reinforcing fitting 151L. As a result, the shield plate 56 and the large second reinforcing fitting 151L are in electrical communication with each other and become equipotential, and the large first reinforcing fitting 51L that comes into contact with the outer cover portion 153*d* of the large second reinforcing fitting 151L and the contact protrusion 53*c* of the inclined elastic arm 53*b*, and the shield plate 56 also become equipotential. Therefore, shielding properties are improved.

The first connector 1 and the second connector 101 in the present embodiment can be used as a connector assembly for connecting conductive traces that carry various currents or electrical signals to each other. An example will be described in which the connectors are used to connect conductive traces of two high frequency (e.g., frequency of 10 (GHz) or higher) signal lines each having two ground lines and conductive traces for two pairs of DC power lines.

In this case, in the first connector 1, for example, the tail 62 of the first terminal 61A1 is connected to a connection pad coupled to the conductive trace of the first high frequency signal line in the first substrate, and the tail 62 of the first terminal 61A2 and the connecting foot 52*g* of the first end wall covering unit 52 and the connecting foot 53*f* of the first side wall covering unit 53 in the first reinforcing fitting 51LA are connected to the connection pad coupled to the conductive traces of two ground lines of the first high frequency signal line. In other words, the conductive trace of the first high frequency signal line of the first substrate is connected to the first terminal 61A1 that functions as a high frequency terminal, and the conductive traces of the two ground lines of the first high frequency signal line are connected to the first reinforcing fitting terminal 53A1 and the first terminal 61A2 that function as ground terminals. Similarly, the conductive trace of the second high frequency signal line of the first substrate is connected to the first terminal 61B1 that functions as a high frequency terminal, and the conductive traces of the two ground lines of the first high frequency signal line are connected to the first reinforcing fitting terminal 53B1 and the first terminal 61B2 that function as ground terminals.

Furthermore, in the second connector 101, the conductive trace of the first high frequency signal line of the second substrate is connected to the second terminal 161A1 that functions as a high frequency terminal, and the conductive traces of the two ground lines of the first high frequency signal line are connected to the second reinforcing fitting terminal 153A1 and the second terminal 161A2 that function as around terminals. Similarly, the conductive trace of the second high frequency signal line of the second substrate is connected to the second terminal 161B1 that functions as a high frequency terminal, and the conductive traces of the two ground lines of the second high frequency signal line are connected to the second reinforcing fitting terminal 153B1 and the second terminal 161B2 that function as ground terminals.

In this way, the first reinforcing fitting terminal 53A1 and the first terminal 61A2, as well as the first reinforcing fitting terminal 53B1 and the first terminal 61B2, which each are the ground terminal connected to the ground, are located on both sides of the first terminal 61A1 and first terminal 61B1 which are high frequency terminals connected to first and second high frequency signal lines. This forms a pseudo-waveguide centered on the first terminal 61A1 and a pseudo-waveguide centered on the first terminal 61B1. Thus, the first and second high frequency signals are transmitted without being affected by noise from the outside and without affecting noise on the outside.

In addition, the engaging protrusion 56*f* of the vertical arm 56*e* of the shield plate 56 engages with and comes into contact with the outer cover portion 152*e* of the second reinforcing fitting 151LA and the second reinforcing fitting 151LB, the shield plate 56, and the second reinforcing fitting terminal 153A1 and the second reinforcing fitting terminal 153B1 that are connected to the ground lines, become have equipotential, improving shielding properties.

Furthermore, as best illustrated in FIGS. 4A and 5, the first terminal 61A1 and the first terminal 61B1 are not line-symmetric with respect to a center line CL1 of the first housing 11 in the width direction, which passes through a center line CL2 of the shield plate 56, and a straight line SL1 connecting the first terminal 61A 1 to the first terminal 61B1 is not orthogonal to but inclined relative to the center line CL1 of the first housing 11 in the width direction. Thus, as compared to the case where the first terminal 61A1 and the first terminal 61B1 are line-symmetric with respect to the center line of the first housing 11 in the width direction, the distance between the first terminal 61A1 and the first terminal 61B1 is longer. Similarly, as best illustrated in FIGS. 8 and 9A, the second terminal 161A1 and the second terminal 161B1 are not line-symmetric with respect to a center line CL3 of the second housing 111 in the width direction, which passes through the center line CL2 of the shield plate 56, and a straight line SL2 connecting the second terminal 161A1 to the second terminal 161B1 is not orthogonal to but inclined relative to the center line CL3 of the second housing 111 in the width direction. Thus, as compared to the case where the second terminal 161A1 and the second terminal 161B1 are line-symmetric with respect to the center line of the second housing 111 in the width direction, the distance between the second terminal 161A1 and the second terminal 161B1 is longer. Consequently, the first and second high frequency signals are less likely to interfere with each other to further reduce crosstalk.

Furthermore, the first terminal 61A3 and the first reinforcing fitting terminal 53A2, as well as the first terminal 61B3 and the first reinforcing fitting terminal 53B2 are connected to the positive and negative conductive traces for the two pairs of DC power supply lines in the first substrate, and function as power supply terminals. Similarly, the second terminal 161A3 and the second reinforcing fitting terminal 153A2, as well as the second terminal 161B3 and the second reinforcing fitting terminal 153B2 are connected to the positive and negative conductive traces for the two pairs of DC power supply lines in the second substrate, and function as power supply terminals.

Note that the present disclosure is not necessarily limited to this example, and the type of conductive trace connected to each of the first terminal 61, the first reinforcing fitting 51, the second terminal 161, and the second reinforcing fitting 151 can be changed as appropriate. For example, non-high frequency signal line may be connected to the first terminal 61A3 and the first reinforcing fitting terminal 53A2, as well as the first terminal 61B3 and the first reinforcing fitting terminal 53B2. The number of the first terminals 61 and the second terminals 161 can also be changed, and for example, the first terminal 61A3 and the first terminal 61B3 as well as the second terminal 161A3 and the second terminal 161B3 may be omitted.

Thus, in the present embodiment, the second connector 101 has the second housing 111, and the second terminals 161 and the second reinforcing fitting terminals 153A1, 153A2, 153B1, and 153B2 that are attached to the second housing 111, and is fitted with the first connector 1. The second housing 111 includes the recessed groove 113 and the second side walls 112 that extend in the longitudinal direction of the second housing 111 and define both sides of the recessed groove 113. The plurality of second terminals 161 and the second reinforcing fitting terminals 153A1, 153A2, 153B1, 153B2 are disposed along each of the second side walls 112, and the plurality of second terminals 161 and the second reinforcing fitting terminals 153A1, 153A2, 153B1, 153B2 disposed along each of the second side walls 112 include a second terminal 161A1 and a second terminal 161B1 that function as one high frequency terminal, and a second terminal 161A2 and a second terminal 161B2 as well as the second reinforcing fitting terminal 153A1 and the second reinforcing fitting terminal 153B1 that function as ground terminals disposed on both sides of the second terminal 161A1 and the second terminal 161B1. In plan view, the straight line connecting the second terminal 161A1 and the second terminal 161B1 disposed along the second side wall 112 on both sides is inclined with respect to the center line of the second housing 111 in the width direction, and when the second connector is fitted with the first connector 1, the shield plate 56 of the first connector 1 is at least partially accommodated in the recessed groove 113 and extends along the center line.

As a result, the shield plate 56 extends along the center line of the second housing 111 in the width direction, and the ground terminals are disposed on both sides of the respective high frequency terminals, thereby improving the shielding effect. In addition, since the straight line connecting the high frequency terminals disposed along the second side walls 112 on both sides is inclined with respect to the center line of the second housing 111 in the width direction, the distance between the high frequency terminals increases to reliably reduce cross talk and improve the reliability.

Moreover, among the second terminals 161 and the second reinforcing fitting terminals 153A1, 153A2, 153B1, and 153B2, terminals other than the high frequency terminal and the ground terminals are power supply terminals. Furthermore, at least four second terminals 161 and at least four second reinforcing fitting terminals 153A1, 153A2, 153B1, and 153B2 are disposed along each of the second side walls 112. Further, the second housing 111 includes the second protrusion ends 122 that are formed at both longitudinal ends and inserted into the fitting recess 22 formed on the first protrusion end 21 of the first housing 11, the second reinforcing fittings 151 divided into two in the width direction of the second housing 111 are attached to each of the second protrusion ends 122, and one of the divided second reinforcing fittings 151 includes the second reinforcing fitting terminals 153A1 and 153B1 that are the ground terminals disposed on both sides of the high frequency terminal. Furthermore, the one of the divided second reinforcing fittings 151 including the second reinforcing fitting terminals 153A1 and 153B1 that are the ground terminals disposed on both sides of the high frequency terminal is attached to the second protrusion end 122 such that the divided second reinforcing fittings 151 face each other on a diagonal of the substantially rectangular second housing 111 in plan view. Furthermore, when the second connector is fitted with the first connector 1, the shield plate 56 comes into contact with one of the two divided second reinforcing fittings 151 at both longitudinal ends. Furthermore, one of the two divided second reinforcing fittings 151 is larger than the other in the width direction dimension of the second housing 111.

Note that the disclosure herein describes features relating to suitable exemplary embodiments. Various other embodiments, modifications, and variations within the scope and spirit of Scope of the patent Claims appended hereto will naturally be conceived of by those skilled in the art upon review of the disclosure herein.

The present disclosure can be applied to a connector.

The invention claimed is:

1. A connector assembly, comprising:

a first connector and a mating second connector adapted to mate with the first connector;

each connector including a housing having first and second opposite end walls and first and second opposite side walls, and first, second, third and fourth reinforcing;

fittings provided on the housing, wherein the first reinforcing fitting is provided on the first end wall and the first side wall, the second reinforcing fitting is provided on the first end wall and the second side wall, the third reinforcing fitting is provided on the second end wall and the first side wall, and the fourth reinforcing fitting is provided on the second end wall and the second side wall, each reinforcing fitting including an end wall covering unit and a side wall covering unit which are connected with each other, the end wall covering unit of each reinforcing fitting includes an outer cover portion having a connecting foot, the side wall covering unit of each reinforcing fitting includes an outer cover portion having a connecting foot; and wherein the first reinforcing fittings contact each other when the first and second connectors are mated, the second reinforcing fittings contact each other when the first and second connectors are mated, the third reinforcing fittings contact each other when the first and second connectors are mated, and the fourth reinforcing fittings contact each other when the first and second connectors are mated.

2. The connector assembly according to claim 1, wherein the connecting foot of the outer cover portion of the end wall covering unit of each reinforcing fitting of the first connector is located outside of a longitudinal direction of the first connector;

the connecting foot of the outer cover portion of the side wall covering unit of each reinforcing fitting of the first connector is located outside of a width direction of the first connector;

the connecting foot of the outer cover portion of the end wall covering unit of each reinforcing fitting of the second connector is located outside of a longitudinal direction of the second connector; and the connecting foot of the outer cover portion of the side wall covering unit of each reinforcing fitting of the second connector is located outside of a width direction of the second connector.

3. The connector assembly according to claim 1, wherein the first connector includes a terminal, the connecting feet of the first connector are substantially flush with a lower surface of a tail of the terminal.

4. The connector assembly according to claim 1, wherein the side wall covering unit of each reinforcing fitting of the first connector has an inclined elastic arm which contacts with the outer cover portion of the side wall covering unit of the respective reinforcing fitting of the second connector when the first and second connectors are mated.

5. The connector assembly according to claim 1, wherein each reinforcing fitting of the first connector further includes an upper surface portion connecting the end wall covering unit with the side wall covering unit, and an outer cover portion which extends downward from an outer edge of the upper surface portion, and each reinforcing fitting of the second connector further includes an upper surface portion connecting the end wall covering unit with the side wall covering unit.

6. The connector assembly according to claim 1, wherein the first reinforcing fitting of the first connector covers half or more of the first end wall of the housing of the first connector, the second reinforcing fitting of the first connector covers less than half of the first end wall of the housing of the first connector, the third reinforcing fitting of the first connector covers half or more of the second end wall of the housing of the first connector, and the fourth reinforcing fitting of the first connector covers less than half of the second end wall of the housing of the first connector.

7. The connector assembly according to claim 6, wherein the first and third reinforcing fittings are disposed to be opposed to each other on a first diagonal of the first housing, and the second and fourth reinforcing fittings are disposed to be opposed to each other on a second diagonal of the first housing.

* * * * *